US006219641B1

(12) United States Patent
Socaciu

(10) Patent No.: US 6,219,641 B1
(45) Date of Patent: *Apr. 17, 2001

(54) SYSTEM AND METHOD OF TRANSMITTING SPEECH AT LOW LINE RATES

(76) Inventor: Michael V. Socaciu, 18 Bixby La., Westford, MA (US) 01886

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/987,412

(22) Filed: Dec. 9, 1997

(51) Int. Cl.[7] .................................................... G10L 15/04

(52) U.S. Cl. .......................... 704/251; 704/201; 704/260; 704/235

(58) Field of Search .................................... 704/229, 235, 704/254, 251, 201, 260

(56) References Cited

U.S. PATENT DOCUMENTS 4,473,904 * 9/1984 Suehiro et al. ........................ 381/36
4,507,750 * 3/1985 Frantz et al. ......................... 364/900
4,741,037 * 4/1988 Goldstern ............................... 381/47
4,797,929 * 1/1989 Gerson et al. ......................... 381/43
5,012,518 * 4/1991 Liu et al. ............................... 381/42
5,231,670 * 7/1993 Goldhor et al. ....................... 381/43
5,379,036 * 1/1995 Storer ..................................... 341/51
5,384,892 * 1/1995 Strong ................................. 395/2.52
5,425,128 * 6/1995 Morrison ............................. 395/2.52
5,454,062 * 9/1995 La Rue ............................... 395/2.63
5,704,002 * 12/1997 Massaloux .......................... 395/2.29
5,748,840 * 5/1998 La Rue ............................... 395/2.63
5,752,227 * 5/1998 Lyberg ................................ 704/235
5,836,003 * 11/1998 Sadeh .................................... 341/51

OTHER PUBLICATIONS

Gersho, "Advances in Speech and Audio Compression", Proceedings of IEEE, Jun. 1994, vol. 82, Issue 6, pp. 900–918).*

* cited by examiner

*Primary Examiner*—David Hudspeth
*Assistant Examiner*—Vijay B Chawan

(57) ABSTRACT

A method of transmitting spoken words including a speech recognition engine in a computer system, the speech recognition engine having a data dictionary containing a number of words associated with a corresponding number of codes, receiving a word in a microphone system of the computer system, recognizing the word, checking the word in the data dictionary for an associated code, assigning the word the associated code, determining whether another word has been received, repeating the steps of recognizing, checking, assigning, and determining the end of speech, packing the associated codes into a first sequence; and transmitting the first sequence via a communication link attached to the computer system. As an enhancement, translating the phrases before encoding them provides automatic language translation. At receiving side, decomposing the received sequence of codes, transforming the sequence of codes into text words and reproducing the text into the original or the translated speech through a text to speech engine.

6 Claims, 6 Drawing Sheets

| | | | | | |
|---|---|---|---|---|---|
| "This | is | an | example | of | compression" |
| 7 | 4 | 2 | 132 | 285 | 473 |

*Figure 4*

SYSTEM AND METHOD OF TRANSMITTING SPEECH AT LOW LINE RATES

FIELD OF THE INVENTION

The present invention relates to the field of telecommunications and speech recognition, and more particularly to an apparatus and method of ultra high speech compression and language translation.

BACKGROUND OF THE INVENTION

As is well known, computer systems, or more generally, any central processor unit (CPU) machine, typically receive input and produce output via traditional devices such as keyboard input, tape, disk, and CD-rom. By way of example, a first user may type a letter into a computer system via a computer keyboard. The keyboard input is typically displayed on a monitor. From there, the letter may be electronically stored on a disk drive, printed on a printer, or electronically mailed (i.e., E-mail) over a communications network like a local area network (LAN) to a second user using some other computer system on the LAN. The second user receives notification of the received letter (i.e., E-mail notification) and uses his computer system and its corresponding E-mail system to display the received letter.

As is also known, methods have been developed to provide voice recognition for computer input in place of keyboard input. With such voice recognition methods, a user speaks into a sound subsystem of the computer and through a matching of the user's vocabulary with a voice recognition dictionary stored in the computer system, the user's spoken words are converted to digital signals and processed and/or stored in the computer system. Further, it is known that computer systems having sound subsystems coupled to a text-to-speech engine may match digitally stored words with spoken words and produce the audible words through the sound subsystems.

It is also well known that present speech compression algorithms like different variants of LPC (Linear Prediction Coding), such as MELP and CELP, may provide compression rates of 2.4 kilobits per second (Kbps) or lower. What is desired is a method and system that approaches compression rates under 100 bits per second and thus provides ultra high speech compression (and language translation) between two parties.

SUMMARY OF THE INVENTION

In accordance with the principles of the present invention a method of transmitting spoken words is provided including a speech recognition engine in a computer system, the speech recognition engine having a data dictionary containing a number of words associated with a corresponding number of codes, receiving a word in a microphone system of the computer system, recognizing the word, checking the word in the data dictionary for an associated code, assigning the word the associated code, determining whether another word has been received, repeating the steps of recognizing, checking, assigning, as long as one determines there are new input words, packing the associated codes into a first sequence; and transmitting the first sequence via a communication link attached to the computer system. Furthermore, as an enhancement, translating the phrases before encoding them provides automatic language translation.

At the receiving side, decomposing the received sequence of codes, transforming the sequence of codes into text words and reproducing the text into the original or the translated speech through a text to speech engine.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 4 is an illustrative example of word coding in accordance with the present invention;

DETAILED DESCRIPTION OF THE PREFERRED EMBODIMENT(S)

Figure 1:
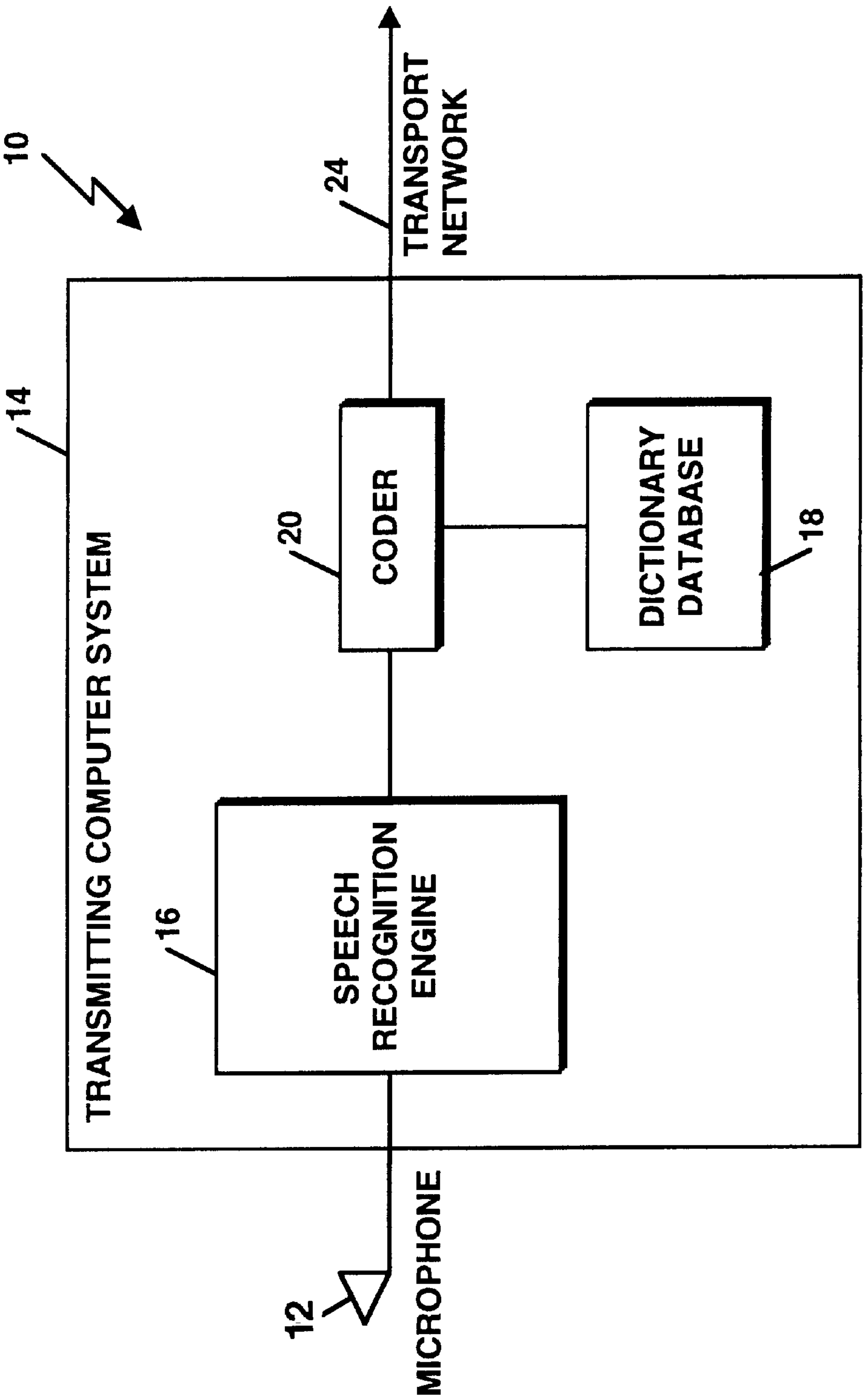
FIG. 1 is a block diagram of an exemplary ultra high speech compression system in a transmitting computer system in accordance with the present invention.

Referring to FIG. 1 an exemplary ultra high speech compression system 10 is shown to include a microphone 12 connected to an exemplary transmitting computer system 14. The transmitting computer system 14 is shown to include a speech recognition engine 16. The speech recognition engine 16 of the transmitting computer system 14 is shown connected to a coder 20 that uses a dictionary database 18. In an exemplary operation, speech is received by the microphone 12 and recognized in the speech recognition engine 16. Once recognized, the spoken words are encoded using the dictionary database 18, and with this the speech is virtually compressed and sent out over a transport network 24.

Figure 2:
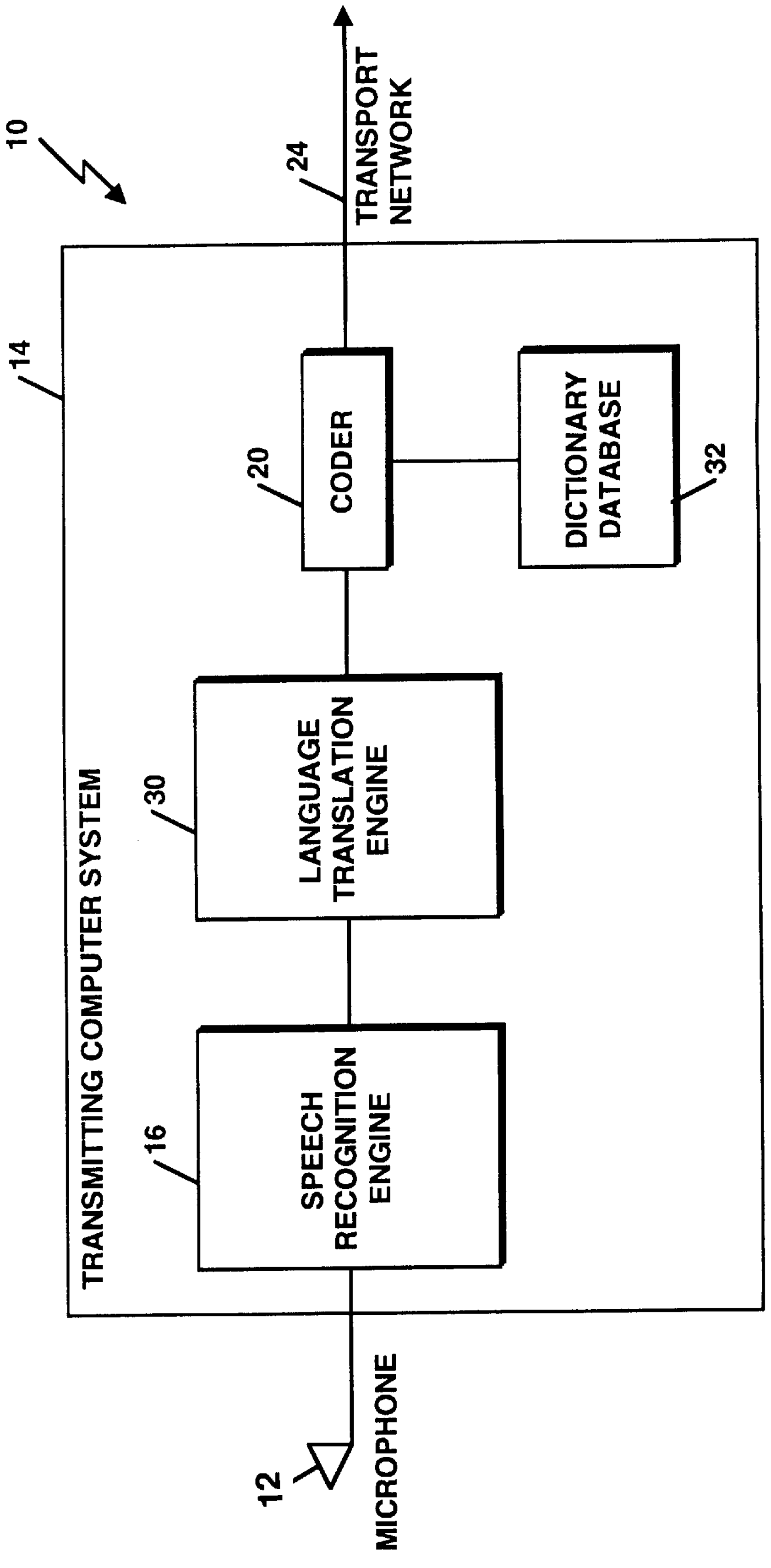
FIG. 2 is a block diagram of an exemplary ultra high speech compression and language translation system in a transmitting computer system in accordance with the present invention.

Referring to FIG. 2 the exemplary ultra high speech compression system 10 of FIG. 1 includes an enhancement of speech (or language) translation. By way of example, language A words are spoken into the microphone 12 and recognized by the speech recognition engine 16. The recognized phrases are passed through the language translation engine 30, which outputs phrases in language B, for example. The words in language B are encoded by the coder 20 using a language B dictionary 32 and a sequence of codes (not shown) representing compressed and translated speech is sent over the transport network 24.

Figure 3:
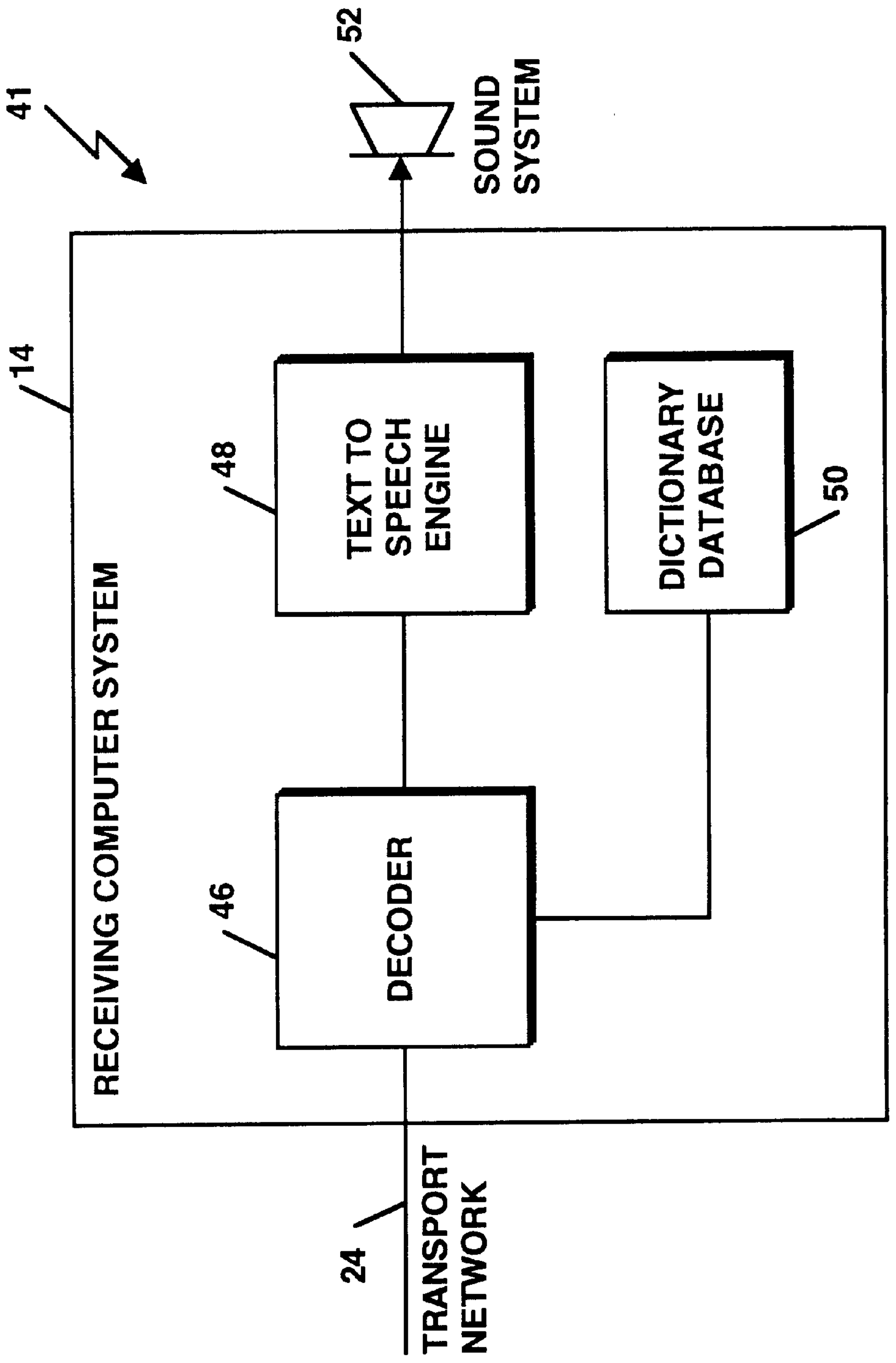
FIG. 3 is a block diagram of an exemplary ultra high speech compression system in a receiving computer system in accordance with the present invention.

Referring to FIG. 3, an exemplary ultra high speech compression system in a receiving computer system 41 is illustrated. A sequence of codes (not shown) is received in the transport network 24 and passed through a decoder 46 which parses the codes and transforms it into a sequence of words using the dictionary 50. One should note that this dictionary is the same one used at the transmitting side to assign codes to the recognized words of FIG. 1 and 2, but the operation is reversed. Further, the decoded words are passed through the text to speech engine 48 and reproduced as spoken words in a sound system 52.

Referring to FIG. 4, an example of how the speech recognition engine 16 and the coder 20 codes speech is illustrated. As seen in FIG. 3, each word of the sentence "This is an example of compression" is assigned a unique code. Specifically, the word "This" is assigned the number "7," the word "is" is assigned the number "4," the word "an" is assigned the number "2," the word "example" is assigned the number "132," the word "of" is assigned the number "285," and the word "compression" is assigned the number "473." Thus, in this example, the sentence "This is an example of compression" results in a string of assigned numbers, i.e., "7 4 2 132 285 473."

What the example of FIG. 4 illustrates is the recognition of words and the mapping of each word, through a one to one mapping process, to a unique code sequence. The mapping is performed according to the dictionary database 18 in FIG. 1 or 32 in FIG. 2. For N words the dictionary database would require code words of [log(base 2)N] bits length. For example, a one thousand (1000) word dictionary have 10 bits long code words.

Ultra high compression results through sending the sequence of codes instead of compressed speech information over transport network 24. At the reception of codes, the sequence of codes is transformed, i.e., unpacked and decoded, through the same mapping applied to the same dictionary data base (same means the dictionary and mapping used at the source side). The resultant text is then passed through the text to speech engine 48 (of FIG. 3) and thus the original speech information is reproduced at a receiving side. Thus at the receiving side the code sequence "7 4 2 132 285 473" is transformed into the original phrase "This is an example of compression".

It is preferred that the text to speech engine 48 (of FIG. 2) on the reception uses speech parameters like the pitch and the gain exactly as they were detected on the source side, in order to reproduce the transported speech.

In one more example, a two second phrase like "we like to highly compress speech", passed on the source side through the speech recognition engine 16 of FIG. 1 or FIG. 2, results in a sequence of six recognized words. The sequence of the six recognized words is mapped using the dictionary data base 18 or 32 in a sequence of six codes. If the dictionary database contains one thousand words dictionary, this phrase may be encoded in six 10 bit codes or 60 bits. This would result in a rate of 60 bits per 2 seconds, or 30 bits per second.

It should be noted that adding a language translation engine (30 in FIG. 2) to the speech recognition engine 16 would provide an additional service of language translation, i.e., if a speaker speaks language A, a receiver may receive language B.

Figure 5:
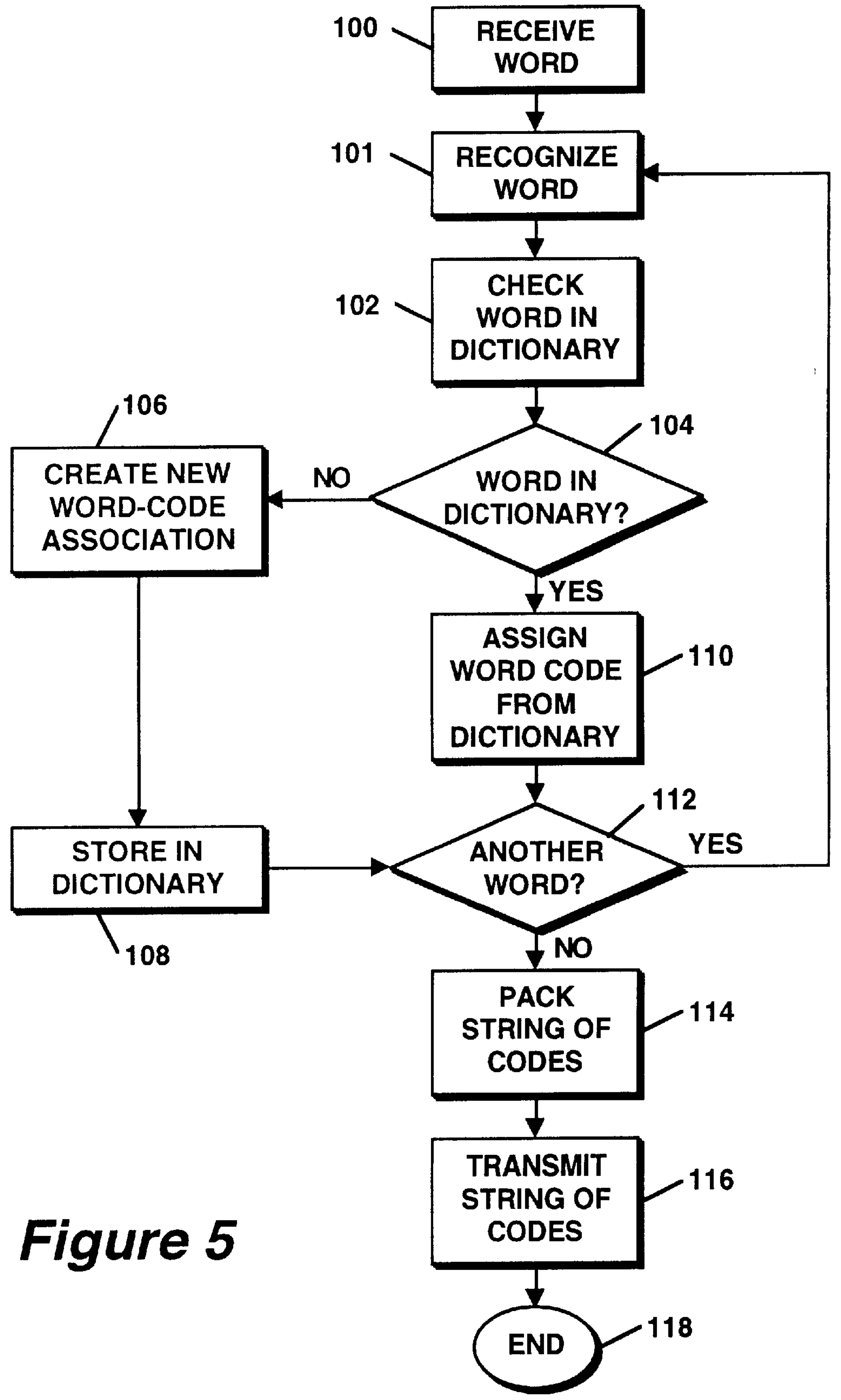
FIG. 5 is a flow chart illustrating the steps of an ultra high speech compression and language translation method in transmitting voice data in accordance with the present invention.

Referring to FIG. 5, a flow chart illustrating the steps of an ultra high speech compression method in making a transmission of voice data in accordance with the present invention starts at step 100 when a word of speech is received. At step 101 the word is recognized. At step 102 the received word is checked against the data dictionary. If at step 104 the received word is found not to be in the data dictionary, at step 106 a new word-to-code association is created and at step 108 stored in the data dictionary. If at step 104 the received word is in the data dictionary, at step 110 the received word is mapped to its corresponding code. If at step 112 another word is received, the process loops back to step 102. If at step 112 there are no more received words to check and map, at step 114 the string of codes, representing the string of received words, is packed for transmission. At step 116 the packed string of codes is transmitted and the process ends at step 118.

Figure 6:
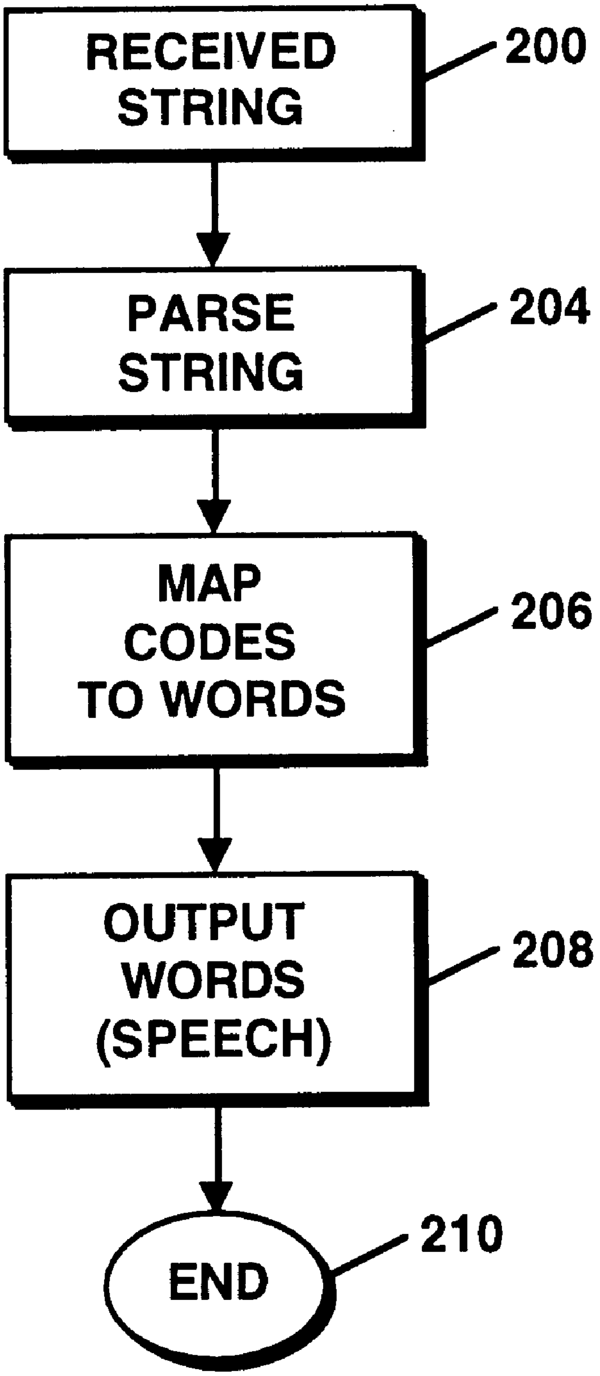
FIG. 6 is a flow chart illustrating the steps of an ultra high speech compression and language translation method in receiving voice data in accordance with the present invention.

Referring to FIG. 6, a flow chart illustrating the steps of an ultra high speech compression method in making a reception of voice data in accordance with the present invention starts at step 200 when a packed string of codes is received. At step 202 the received packed string of codes is unpacked. At step 204 the unpacked string of codes is parsed and at step 206 each code is mapped to its corresponding word. At step 208 each word is outputted, i.e., reproduced as a sound word, in a text to speech engine, and the process ends at step 210.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A method of transmitting a plurality of codes associated with individual words of speech comprising:

providing a speech recognition engine in a computer system, the speech recognition engine having a data dictionary containing a plurality of words associated with a corresponding plurality of codes;

receiving a word of speech in a microphone system of the computer system;

recognizing the word of speech;

checking the word of speech in the data dictionary for an associated code;

assigning the word of speech the associated code;

determining whether another word of speech has been received;

repeating the steps of recognizing, checking, assigning, and determining the presence of new input words of speech; and transmitting the plurality of associated codes via a communication link attached to the computer system.

2. The method of transmitting a plurality of codes associated with individual words of speech according to claim 1 wherein the associated code is log(base 2) N bits long where N is equal to the number of words in the data dictionary.

3. A speech transmission system comprising:

a computer system, the computer system comprising:

a microphone system;

a speech recognition engine, the speech recognition engine having a data dictionary containing a plurality of words of speech, a speech translation engine, the speech translation engine outputting a plurality of word phrases corresponding to the plurality of words of speech recognized in the speech recognition engine;

a coding unit, the coding unit assigning a plurality of codes to the plurality of word phrases which represent speech; and a communications line, the communications line providing connection to a plurality of additional systems, the communications line used to transmit the assigned plurality of codes.

4. The system according to claim 3 wherein the speech translation engine includes a dictionary containing a plurality of foreign language translation codes.

5. An efficient high speed speech transmission system comprising:

a microphone, said microphone receiving a plurality of spoken words of speech;

a first computer system, said microphone adapted to said first computer system, said first computer system further comprising:

a speech recognition engine, said speech recognition engine identifying the plurality of spoken words of speech received by said microphone;

a coding unit connected to said speech recognition engine, said coding unit having a mapping function to map one of a unique plurality of codes to each of the plurality of spoken words;

a transmission line, said transmission line connected to the coding unit and providing transmission of each of the unique plurality of codes to a second computer system.

6. The efficient high speed speech transmission system according to claim 5 wherein the second computer system comprises:

a decoding unit, the decoding unit converting each of the unique plurality of codes to an associated plurality of words of speech;

a speech recognition unit for receipt of each of the associated plurality of words of speech;

a speaker subsystem, said speaker subsystem receiving and outputting the associated plurality of words of speech.

* * * * *